M. A. KELLER.
Straw Carrier.
No. 97,520.
Patented Dec. 7, 1869.
Fig. 1.
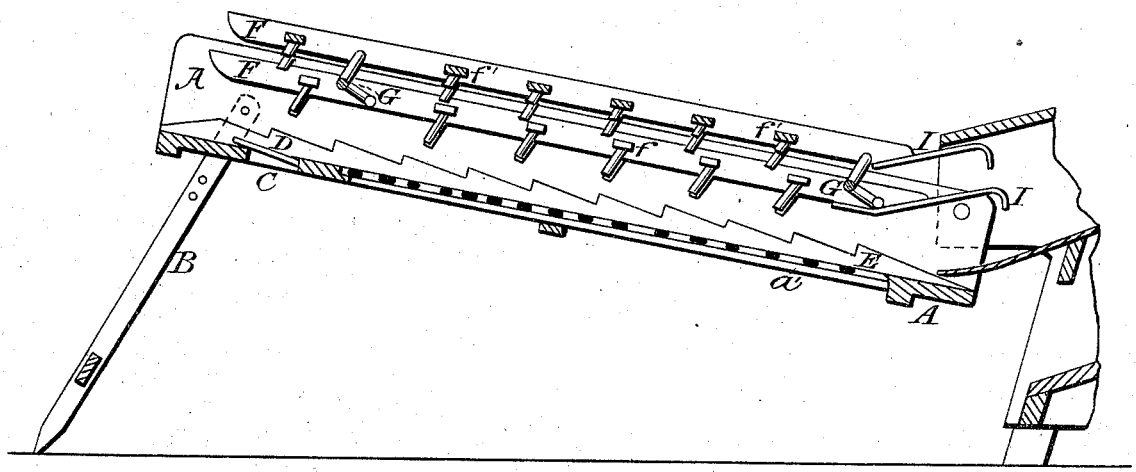
Fig. 2.
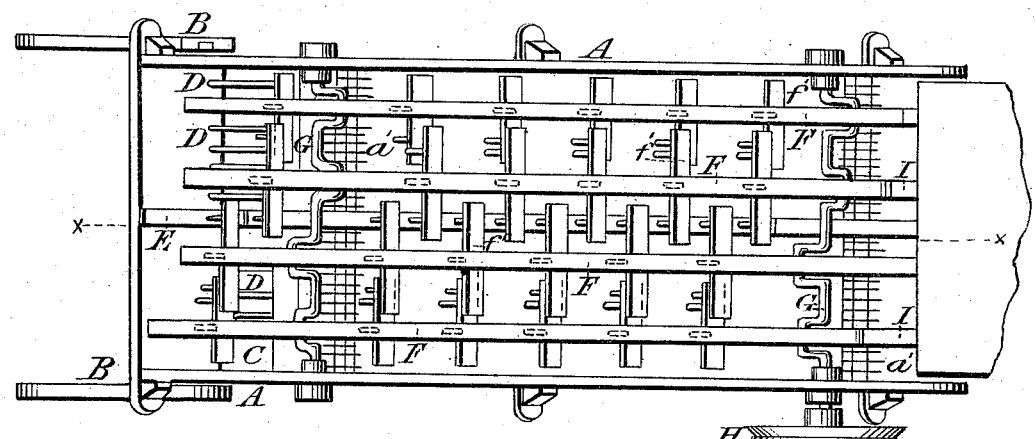
Fig. 3.
Witnesses:
Inventor:
Moses A. Keller

United States Patent Office.

MOSES A. KELLER, OF LITTLESTOWN, PENNSYLVANIA.

Letters Patent No. 97,520, dated December 7, 1869.

IMPROVEMENT IN SHAKERS FOR THRESHING-MACHINES.

The Schedule referred to in these Letters Patent and making part of the same.

*To all whom it may concern:*

Be it known that I, MOSES A. KELLER, of Littlestown, in the county of Adams, and State of Pennsylvania, have invented a new and useful Improvement in Shakers for Threshing-Machines; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved shaker, taken through the line $x\ x$, fig. 2, showing it attached to the discharge-spout of a thresher.

Figure 2 is a top or plan view of the same.

Figure 3 is a detail cross-section of one of the shaking-bars.

Similar letters of reference indicate corresponding parts.

My invention has for its object to furnish an improved shaker for separating the grain and straw as they come from the thresher, which shall be simple in construction, and effective in operation; and It consists in the construction and combination of various parts of the machine, as hereinafter more fully described.

A is the frame of the shaker, the forward end of which is detachably secured to the discharge-spout of a threshing-machine.

The rear end of the frame A is supported upon a frame, B, the upper end of which is adjustably pivoted to the rear part of the said frame A, so that the rear end of the shaker may be raised or lowered, as required.

The bottom $a'$, of the shaker A, may be in the form of a perforated plate, or of a screen, as may be desired.

In the bottom $a'$, near its rear end, is formed an opening, C, which is crossed by bars D running longitudinally with the shaker A, to insure the grain being entirely removed from the straw, before the said straw escapes from the shaker.

E is a bar running longitudinally through the middle part of the shaker, and securely attached to the bottom $a'$. The upper edge of the bar is notched, or formed into a series of inclines, as shown in fig. 1, so as to constantly tend to raise the straw from the bottom of the shaker as it is passing back through said shaker.

F are four bars running longitudinally through the shaker, the ends of which are pivoted to cranks formed upon the shafts G, which work in bearings in the sides of the shaker A.

Each of the cranks of the shaft G, projects at a different angle from the other, so that the bars F may be raised and lowered alternately.

$f$ are short cross-bars attached at right angles to the bars F.

The bars F and cross bars $f$, are provided with teeth projecting downward and rearward, so as, as the bars F $f$ move downward and strike against the straw moving through the shaker, to knock the kernels of grain out of said straw, and at the same time to move the straw toward the rear end of the shaker.

The four crank-shafts are driven from the threshing-machine by a band passing around a pulley, H, attached to the projecting end of the journal of one of said crank-shafts.

I are hooks attached to the forward ends of the bars F, and projecting into the mouth of the discharge-spout of the thresher, to assist in guiding the straw into the shaker.

Having thus described my invention,

What I claim as new, and desire to secure by Letters Patent, is—

1. The bars F, hung upon the crank-shafts G, and carrying the short cross-bars and downwardly-projecting teeth, when provided with the hooks I, projecting into the discharge-spout of the thresher, for the purpose of guiding the straw to the shaker, as herein shown and described.

2. The opening C and bars D, arranged and operating in connection with the bottom of the shaker, substantially as herein shown and described, and for the purpose set forth.

MOSES A. KELLER.

Witnesses:
GEORGE L. COLESTOCK,
ALBERT M. PORTER.